Oct. 11, 1966      J. M. GAULT      3,278,337
DEVICE FOR CONVERTING RADIANT ENERGY INTO ELECTRICAL ENERGY
Filed Aug. 24, 1962
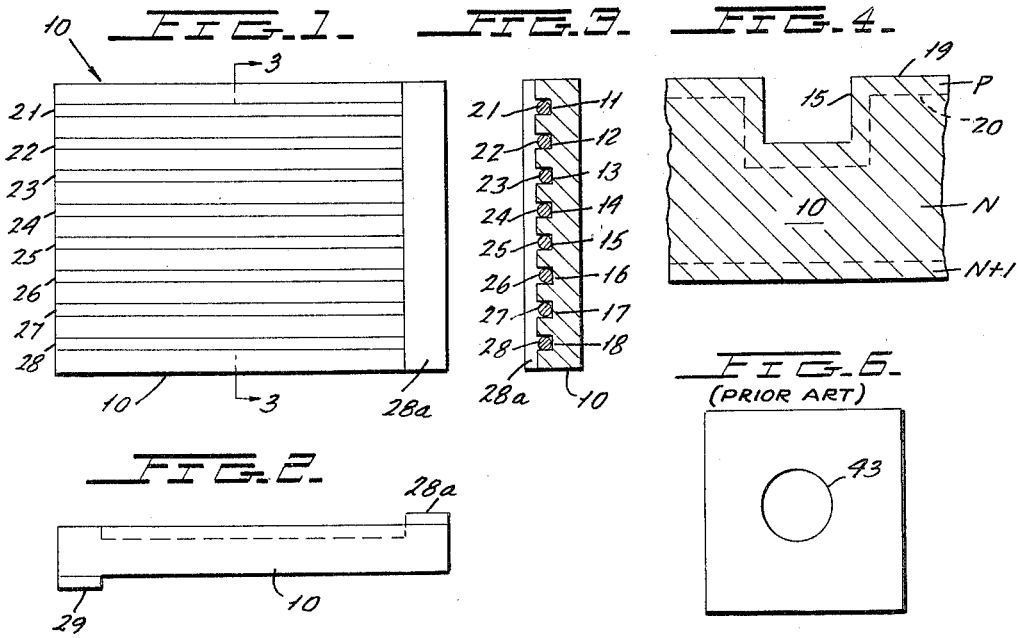
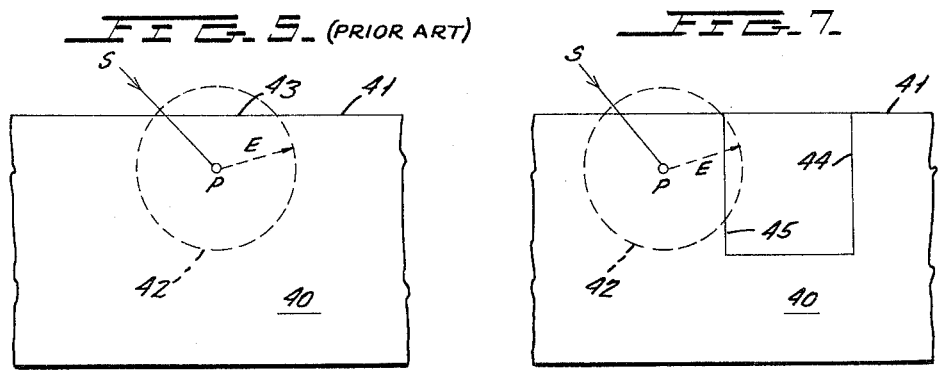
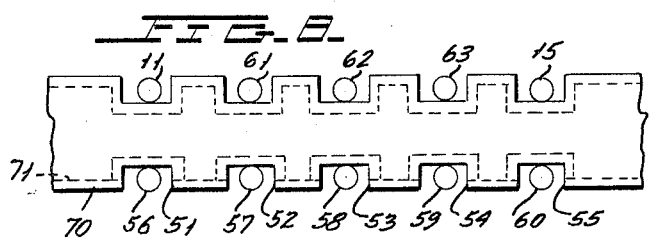
INVENTOR.
JOHN M. GAULT
BY
OSTROLENK, FABER, GERB & SOFFEN
ATTORNEYS United States Patent Office 3,278,337
Patented Oct. 11, 1966

3,278,337
DEVICE FOR CONVERTING RADIANT ENERGY INTO ELECTRICAL ENERGY
John M. Gault, Manhattan Beach, Calif., assignor to International Rectifier Corporation, El Segundo, Calif., a corporation of California
Filed Aug. 24, 1962, Ser. No. 219,336
3 Claims. (Cl. 136—89)

My invention relates to photosensitive devices which convert radiant energy into electrical energy, and more specifically relates to a solar energy converter having improved efficiency.

Solar energy converters such as presently available silicon solar cells have efficiencies which range between 6% and 12%, with the majority of production devices being in the lower range of 6% to 8%.

Means for considerably increasing the efficiency of such solar energy converters are set forth in copending application Serial No. 859,375 filed December 14, 1959 in the name of Moshe Y. Ben-Sira and Baruch Pratt, entitled Silicon Photoelectric Cell, now issued as U.S. Patent 3,053,926 and assigned to the assignee of the present invention. In that application, a thin wire or similar elongated thin collector material is applied as a grid over the photosensitive surface of the converter. This device provides a considerable increase in the efficiency of the device, since it reduces the path from a given point on the surface to the main point of collection of the charge carriers created by incident radiation. That is to say, the application of such thin grids decreases resistance to the flow of electrons or holes through the crystal material and to the point of collection.

As an improvement of the device, and in copending application Serial No. 81,489, filed January 9, 1961, and now abandoned, in the name of Macha, entitled Method of Improving Collector Efficiency of Photocells and assigned to the assignee of the present invention, the grid is placed on the upper surface of the cell, but the grid wires lie flush with the surface, whereby flat transparent cover plates can be placed on the converter surface.

In each of the devices described above, a grid is placed over the surface of the device. Thus, the conductor reduces the photosensitive area by some finite amount and limits the usefulness of the device.

The principle of the present invention is to form the photosensitive surface of a solar energy converter to have an irregular surface as by placing grooves therein, wherein the junction immediately below the surface follows the contour of the irregular surface. Some of the lower portions of the irregularities such as the groves can then receive the grids for the collector wires of the two above noted applications which will inherently lie below the upper surface of the cell. The active surface will now be closer to more points within the volume of the crystal. By bringing this active surface closer to more points within the volume of the crystal, the probability of the capture of a minority charge carrier of a pair created by an incident photon by this active surface is increased, whereby the total efficiency of the device is considerably increased.

Moreover, and in accordance with the invention, additional grooves or irregularities may be created in the opposite and non-active side of the cell with additional processing electrically coupling the collectors on both sides to further increase the efficiency of the device.

Furthermore, the back or non-active side of the cell may be processed to result in the reflection of minority carriers which would normally recombine at this surface. By way of example, in the case of a basic N-type solar cell, the back surface of the cell can have a phosphorous impurity diffused therein to form an N+ region. The N–N+ junction would then result in an electric field which would cause the reflection of minority carriers which might be subseqeuntly collected by the P-N junction at the opposite surface. Therefore, there will be an increase in the efficiency of the cell.

Accordingly, a primary object of this invention is to provide a novel construction for solar energy converters which increases the probability of capture of a minority carrier by the collecting junction.

Another object of this invention is to provide a simple method of manufacture for solar cells which have high efficiencies.

A further object of this invention is to provide a novel high efficiency solar energy converter in which the collecting junction is closer to more points within the body of the crystal.

A further object of this invention is to provide a novel photoelectric device which has collecting grids on the active surface thereof which are depressed beneath the surface of the device with the surface of the device being irregular.

These and other objects of my invention will become apparent from the following description when taken in connection with the drawings, in which:

FIGURE 1 shows a top view of a photoelectric device constructed in accordance with the present invention.

FIGURE 2 shows a side plan view of the device of FIGURE 1.

FIGURE 3 is a side cross-sectional view of FIGURE 1 taken across the lines 3—3 in FIGURE 1.

FIGURE 4 is an enlarged cross-sectional view of one of the grooves of FIGURE 3, and illustrates the manner in which the junction follows the irregular surface.

FIGURE 5 is a schematic view of the surface of a photoelectric device, and indicates the failure of a minority carrier to be collected.

FIGURE 6 is a top view of FIGURE 5.

FIGURE 7 is similar to FIGURE 5, and illustrates the manner in which the novel groove construction permits capture of a minority carrier which could not be captured in the construction of FIGURE 5.

FIGURE 8 is a side cross-sectional view similar to FIGURE 3 to illustrate a further modification of the invention.

Referring first to FIGURES 1, 2 and 3, I have illustrated therein a photoelectric device for use as a solar cell or for converting solar energy into electrical energy. The cell is comprised of a wafer 10 which is preferably of silicon, although other materials could be used. The wafer 10 is also assumed to be of the N-type, although it could be of the P-type as well.

In accordance with the invention, a plurality of grooves such as grooves 11 through 18 are sliced into the upper surface of wafer 10. The grooves can, for example, be 5 mils deep and 5 mils wide. Thereafter a P-type surface layer is applied to the upper surface of the cell, as for example, by diffusing boron into the upper surface.

FIGURE 4 schematically illustrates a portion of the surface of FIGURE 3 including groove 15, and shows a P-type surface layer 19 therein. The P-type surface layer 19 is preferably a very thin layer for increased efficiency.

After the formation of the junction shown as junction 20 in the dotted line in FIGURE 4 between the P-type layer and N-type body of wafer 10, thin wires such as wires 21 through 28 of FIGURE 1 are laid in their respective grooves and are alloyed to the wafer 10. This could be done in the manner shown in copending applications Serial No. 859,375, and Serial No. 81,489 discussed above.

The collector wires 21 through 28 can be wires having a small diameter of the order of 4 to 5 mils. Moreover, the wires could take various configurations other than the parallel arrangement shown, and could be arranged in various grid shapes, circular shapes, or the like.

A main collector elctrode 28a is then alloyed to the wafer body 10, and is caused to be electrically connected to the ends of wires 21 through 28, and serves, for example, as the positive terminal of the device. A negative terminal formed by conductor 29 is then applied to the rear surface of wafer 10 in the usual manner, as illustrated in FIGURE 2.

The manner in which the novel groove arrangement of the invention increases the efficiency of the cell can be best understood from a consideration of FIGURES 5, 6 and 7.

In FIGURE 5, I have illustrated a crystal body 40 having an upper sensitive surface 41. I have drawn a sphere 42 in dotted lines around a point P in FIGURE 5. The point P is assumed to be a point at which a photon of light coming from zone source S and passing through surface 41 is absorbed within the crystal 40 and creates a hole-electron pair at point P.

The sphere 42 represents the approximate distance in which energy can be transported by a minority carrier going in any direction from point P before it will be lost as heat or otherwise absorbed as by recombination with an electron. Thus, a hole which must go beyond the radius of sphere 42 before reaching a point at which a photovoltaic current can be produced, will be lost. Thus, for example, a hole transported in the direction indicated by dotted line E will not contribute to photovoltaic current. It is only those particles which move upwardly into the area shown in FIGURE 6 as area 43 which is a circular area defined by the intersection of surface 41 and sphere 42 which will contribute to the photovoltaic current of the device.

From the above analysis, the efficiency of the cell can be expressed as some function of the ratio of area 43 to the entire area of sphere 42. After recognizing this relationship, I discovered that I can considerably increase this ratio by rendering surface 41 irregular. By way of example, and as illustrated in FIGURE 7, when a groove 44 is placed in surface 41 such that the left-hand wall of the groove intersects sphere 42, the total area will now be the area 43 of FIGURE 6 plus the area 45 which intersects sphere 42, which will be the numerator in the relationship for efficiency expressed above as the ratio of effective area intersected by sphere 42 to the total area of the sphere.

In effect, the arrangement of FIGURE 7 means that the same hole travelling on the dotted line E of FIGURE 5 will now be collected at the left-hand surface of the groove 44 so as to contribute to the photovoltaic current, whereas in the past and as shown in FIGURE 5, this hole did not contribute. Thus, the efficiency of the device having grooves of the type shown in FIGURES 4 and 7 will have improved efficiency. By now placing collector wires in some of these grooves, it will also be apparent that the collector efficiency is further increased.

It is to be noted that in FIGURES 1 through 4, the collector wires are such as to be either flush with, or below, the general upper surface of wafer 10. Thus, the wires will be inherently flush with the surface so that it can receive flat transparent covers in the manner shown in copending application Serial No. 81,489.

Clearly, many other systems of fabrication could be used where, for example, the collector wires are diffused directly into the surface of the cell with both of the collector systems being further processed, as described in copending application Serial No. 81,489, to yield a final flush collector grid arrangement.

A further embodiment of the invention is illustrated in FIGURE 8 which shows a wafer similar to the wafer of FIGURES 1 through 4 with an upper P-N junction 50 following the contour of the irregular grooved upper surface of the wafer.

In FIGURE 8, however, additional grooves such as the grooves 51 through 55 are placed in the lower and inactive surface. These additional grooves will increase the chances of the condition shown in FIGURE 7 to tend to further increase the efficiency of the device. Clearly, these grooves 51 through 55 will carry respective conductors 56 through 60, where the conductors 56 through 60 are electrically connected to collectors such as the collectors 61 through 63 on the upper surface of the cell.

To still further increase the efficiency of the cell, the rear surface may have an N+ region 70 applied thereto to create an N—N+ junction 71. This junction could be formed, for example, by diffusing phosphorous into the lower surface of the cell.

The junction 71 will serve as a reflecting layer which will reflect minority carriers directed downwardly after thier creation back toward the collecting junction so as to further increase the efficiency of the cell.

Although I have described preferred embodiments of my novel invention, many variations and modifications will now be obvious to those skilled in the art, and I perfer therefore to be limited not by the specific disclosure herein but only by the appended claims.

I claim:

1. A photosensitive device comprising a wafer of semiconductor material of one of the conductivity types; said wafer having a grooved upper surface; said grooved upper surface having a conductivity of the other of said conductivity types to define a P-N junction following the contours of said grooved upper surface whereby given points within said wafer are brought relatively close to said junction; said wafer having a bottom surface; said bottom surface having a junction therein of said other of said conductivity types and a plus region of said other of said conductivity types.

2. A photosensitive device comprising a wafer of semiconductor material of one of the conductivity types; said wafer having a grooved upper surface; said grooved upper surface having a conductivity of the other of said conductivity types to define a P-N junction following the contours of said grooved upper surface whereby given points within said wafer are brought relatively close to said junction; said wafer having a bottom surface; said bottom surface having a junction therein of said other of said conductivity types and a plus region of said other of said conductivity types; said bottom surface having grooves therein; said grooves in said bottom surface receiving collector wires.

3. A photosensitive device comprising a wafer of semiconductor material of one of the conductivity types; said wafer having a grooved upper surface; said grooved upper surface having a conductivity of the other of said conductivity types to define a P-N junction following the contours of said grooved upper surface whereby given points within said wafer are brought relatively close to said junction; said grooves having collector wires deposed therein; said wafer having a bottom surface; said bottom surface having a junction therein of said other of said conductivity types and a plus region of said other of said conductivity types; said bottom surface having grooves therein; said grooves in said bottom surface receiving collector wires.

References Cited by the Examiner

UNITED STATES PATENTS

| 2,861,909 | 11/1958 | Ellis | 136—89 X |
| 3,053,926 | 9/1962 | Ben-Sira et al. | 136—89 |
| 3,112,230 | 11/1963 | Rudenberg | 136—89 |

WINSTON A. DOUGLAS, *Primary Examiner.*

ALLEN B. CURTIS, *Examiner.*